No. 666,173. Patented Jan. 15, 1901.
C. H. YOUNG.
CLOTH MEASURING MACHINE.
(Application filed June 4, 1900.)
(No Model.) 3 Sheets—Sheet 2.
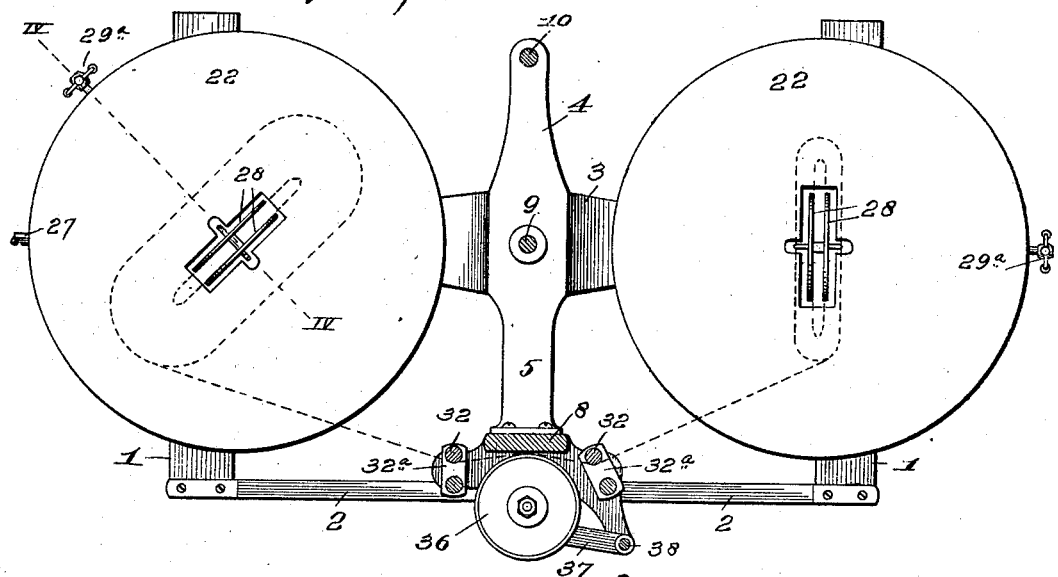
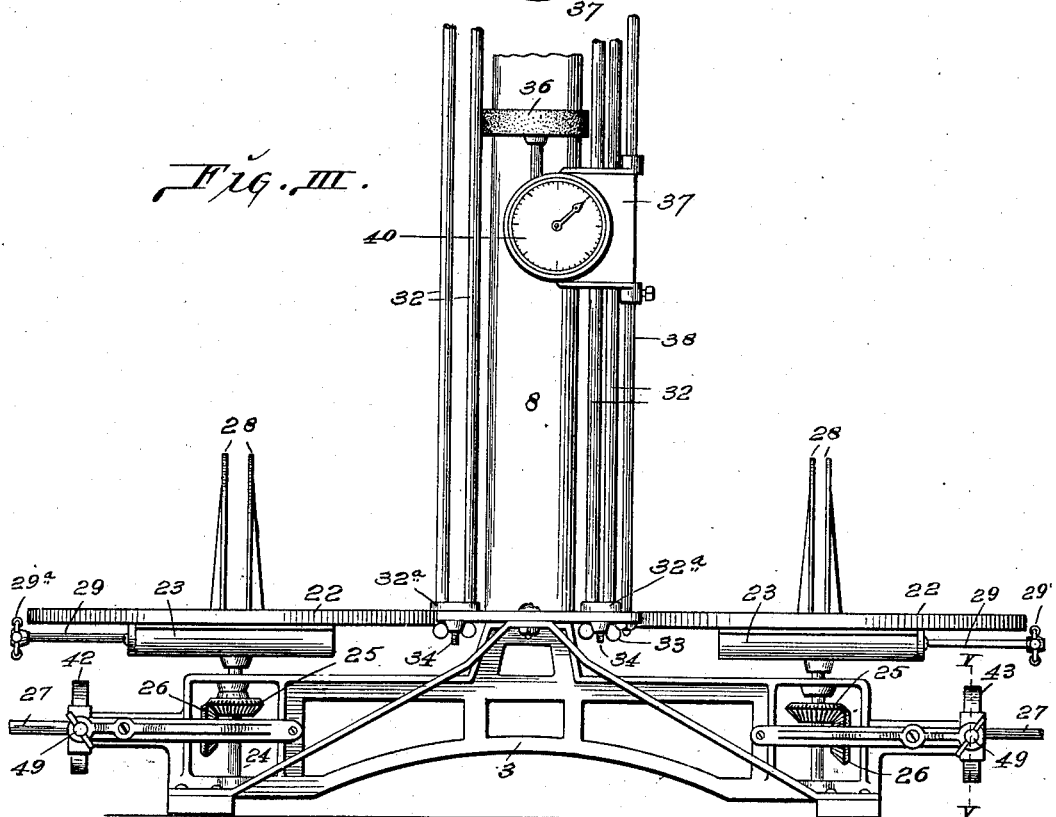
Inventor:—
Charles H. Young
By Wright Bro
atty's No. 666,173. Patented Jan. 15, 1901.
C. H. YOUNG.
CLOTH MEASURING MACHINE.
(Application filed June 4, 1900.)
(No Model.) 3 Sheets—Sheet 3.
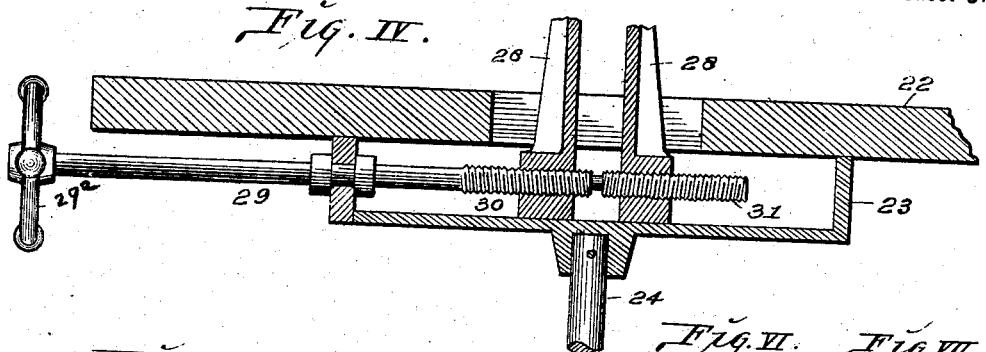
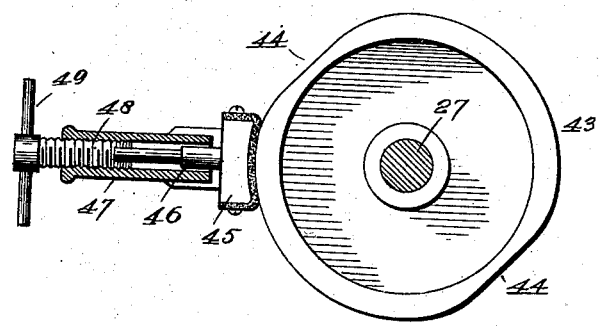
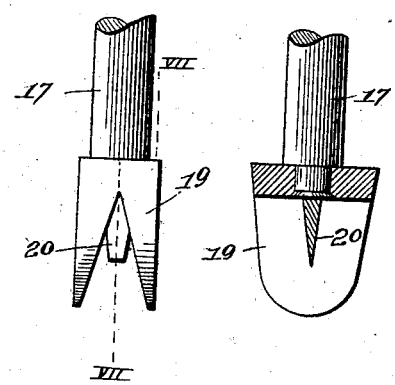
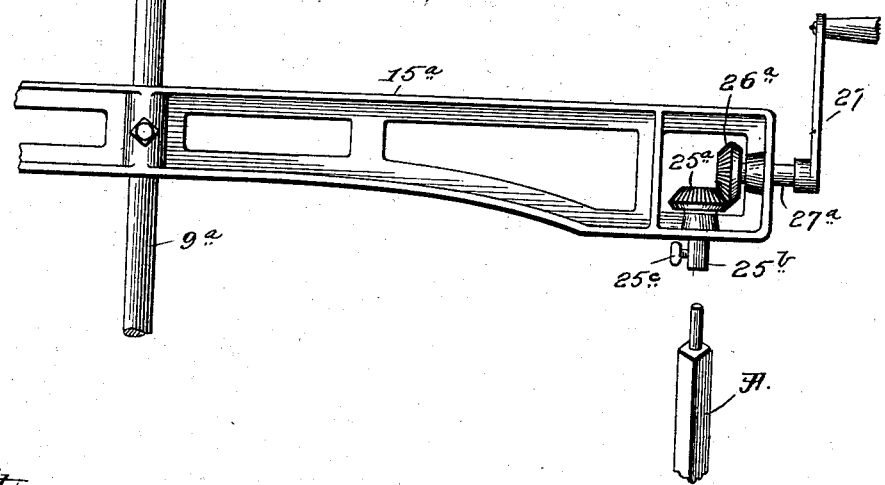
Inventor:—
Charles H. Young.

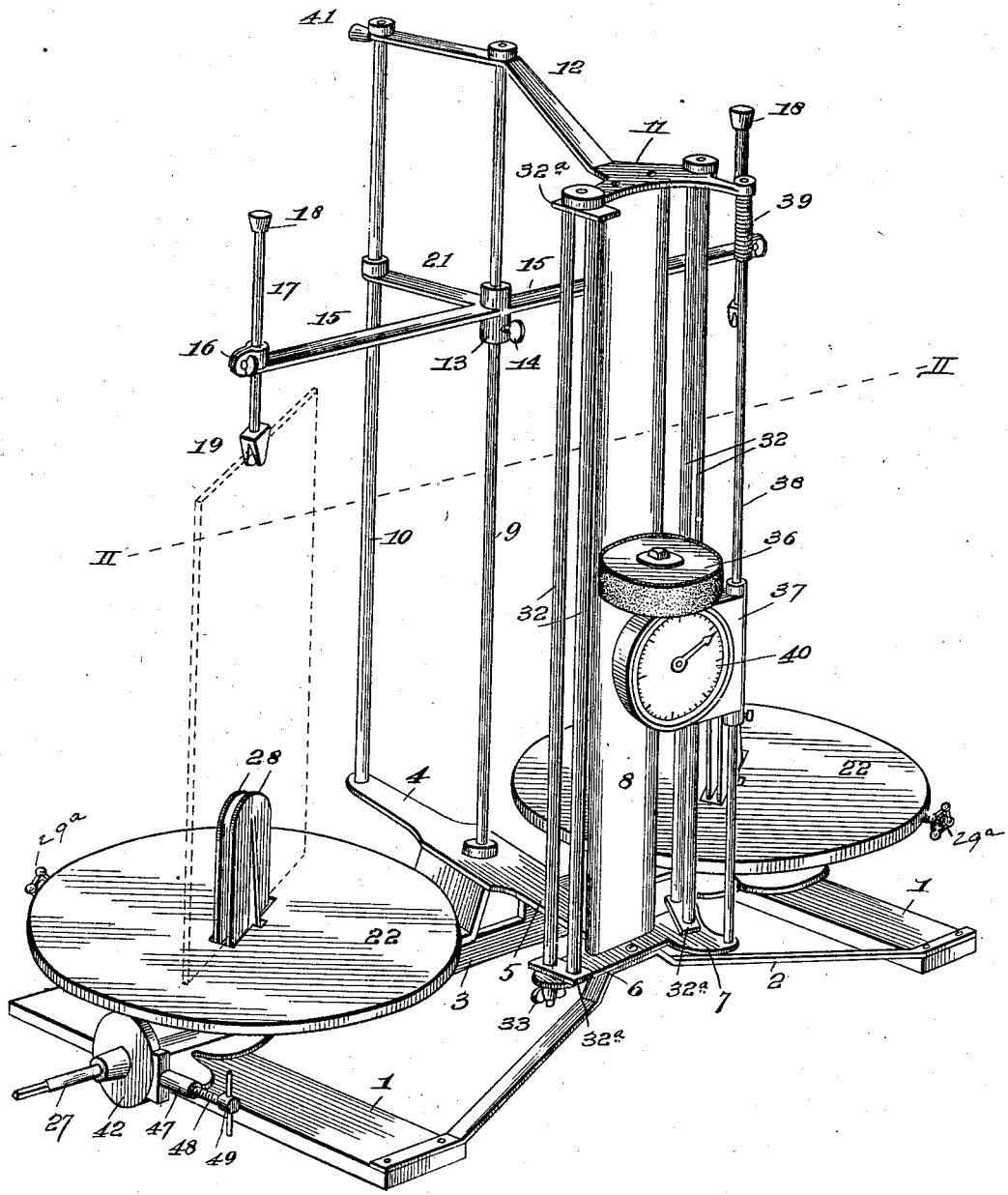

UNITED STATES PATENT OFFICE.

CHARLES H. YOUNG, OF ST. LOUIS, MISSOURI, ASSIGNOR OF TWO-THIRDS TO BENJAMIN F. WITSELL AND FERDINAND M. PERROW, OF SAME PLACE.

CLOTH-MEASURING MACHINE.

SPECIFICATION forming part of Letters Patent No. 666,173, dated January 15, 1901.

Application filed June 4, 1900. Serial No. 18,926. (No model.)

*To all whom it may concern:*

Be it known that I, CHARLES H. YOUNG, a citizen of the United States, residing at the city of St. Louis, in the State of Missouri, have invented certain new and useful Improvements in Cloth-Measuring Machines, of which the following is a full, clear, and exact description, reference being had to the accompanying drawings, forming part of this specification.

My invention relates to a machine for measuring fabrics, such as dry goods and carpets; and the invention consists in features of novelty hereinafter fully described, and pointed out in the claims.

Figure I is a front perspective view of my improved machine. Fig. II is a view partly in horizontal section taken on line II II, Fig. I, and partly in top or plan view. Fig. III is a view in front elevation of the lower part of the machine. Fig. IV is an enlarged detail sectional view taken on line IV IV, Fig. II. Fig. V is an enlarged detail view of one of the brake-wheels of the machine and the adjustable brake-shoe applied thereto, partly in section taken on the line V V, Fig. III. Fig. VI is an enlarged detail view of one of the spool-engaging prongs. Fig. VII is an enlarged detail view of the prong shown in Fig. VI, partly in section taken on line VII VII, Fig. VI. Fig. VIII is a detail view illustrating a modified form of application of the driving-gear of the machine as used when the machine is employed for measuring carpets or like heavy goods.

1 designates the base-bars of the machine, joined by a cross-bar 2 and a frame 3. The frame 3 is provided with a rearwardly-projecting arm 4 and a forwardly-projecting arm 5. The arm 5 is attached to the cross-bar 2 (see Figs. I and III) and has diverging wings 6 and 7. Mounted on the arm 5 above the cross-bar 2 is a guide-bar 8.

9 is a guide-rod attached to the frame 3, and 10 is a stay-rod attached to the outer end of the arm 4.

The guide-strip 8, guide-rod 9, and stay-rods 10 are all connected at their upper ends by a plate 11, having a strap extension 12.

13 designates a slidable collar located on the guide-rod 9 and containing a set-screw 14, by which the collar may be held to the guide-rod in any desired position. Projecting from the collar 13 in diverging directions are arms 15, having at their outer ends clamps 16, that receive slide-rods 17. (See Fig. I.) The slide-rods 17 are provided at their outer ends with elastic tips 18. The inner ends of the slides 17 are equipped with loosely-connected prongs 19, within the forks of which are knife-edges 20, (see Figs. VI and VII,) the purpose of which will hereinafter appear. The collar 13 is held from turning on the guide-rod 9 by a stay 21, that has sliding connection to the stay-rod 10, whereby the sliding-rod-carrying arms 15 are held from rotation with relation to the guide-rod 9.

22 designates turn-tables upon which the cloth to be measured is carried. These turn-tables are seated on plates provided with boxes 23, and the boxes 23 are supported by spindles 24, journaled in the frame 3. Upon the spindles 24 are bevel-pinions 25, that receive the engagement of bevel-pinions 26 on driving-shafts 27. The driving-shafts 27 may be turned by cranks applied thereto or other suitable means.

28 designates clamping-jaws slidably seated in the boxes 23 and projecting through apertures in the turn-tables 22. These clamping-jaws are arranged parallel with each other, and passing through them is an adjustment-rod 29, provided with right and left handed screw-threaded portions 30 and 31, that engage with threaded bores of corresponding description in the clamping-jaws, so that upon the turning of the adjustment-rod by its wheel 29ª the jaws may be caused to approach each other or to separate in reverse rotation of the rod. The clamping-jaws 28 are adapted to receive and hold one end of spools or boards from which the cloth is to be unwound and upon which it is to be wound, the spools or boards being shown in dotted lines in Figs. I and II. The opposite ends of the spools or boards are held by the prongs 19, which are applied thereto by driving the slide-rods 17 inwardly and causing the knife-edges 20 to enter the ends of the spools or boards, the elastic tips 18 affording protection against injury to the hand of the operator in striking and forcing the slide-rods into engagement with the spools or boards. When the spools or boards are placed in position, they are clamped in place by turning the adjustment-rod 29 to move the clamping-jaws 28 toward each other, and the slide-rods 17 are secured from movement by tightening the clamps 16.

32 designates two pairs of parallel tension-rods joined by end plates $32^a$, that are pivotally mounted in the wings 6 and 7 of the arm 5 and in corresponding wings of the plate 11. These pairs of tension-rods are arranged to be set so that the cloth to be measured may be threaded between them and, in passing through between the rods of each pair from one turn-table and parts connected therewith to the other, will be caused to bind more or less, so as to be held taut, the pairs of tension-rods being held in the desired positions by binding-nuts 33 on bolts 34, carried by the end plates $32^a$, to which the tension-rods are connected.

In the operation of measuring cloth upon the machine the roll to be measured is placed on one of the turn-tables 22, and its spool or board is secured by the clamping-jaws 28 and the prongs 19 in the manner described. An empty spool or board is then fitted in place at the other turn-table in like manner to the filled one and the machine is in readiness for service. The cloth to be measured is transferred from the wound roll on its turn-table 22 to and around the empty spool or board on the other turn-table, the cloth being first threaded through between the pairs of tension-rods 32 and across the guide-bar 8 and thence to the spool or board upon which it is to be wound, the turn-table of the receiving side being operated by manipulation of the shaft 27 at that side of the machine. As the cloth passes across the guide-bar 8 it is measured by a rotating measuring-wheel 36, mounted on a frame 37, that is upheld at any desired elevation on a rocking shaft 38. The rocking shaft 38 is surrounded by a coiled spring 39, pivoted to the plate 11 and wing 7 and through the medium of which the shaft is held under tension in such manner as to hold the measuring-wheel 36 pressed toward the guide-bar 8, so that the measuring-wheel is always maintained in contact with the cloth passing across the guide-bar as it is conveyed from the delivery spool or roll to the receiving spool or roll. The shaft of the measuring-wheel 36 has connection with the mechanism of an indicator 40, and as the measuring-wheel revolves the quantity of cloth measured is automatically shown on said indicator.

The machine is used in an upright position for heavy bolts of cloth, so that the tables will carry the weight of the cloth, relieving the clamps from strain. The machine is capable of being used in a horizontal position when light bolts of cloth are being measured. When it lies horizontally, the rear ends of the base-bars 1 form supports at one end of the machine, and a tip 41, carried on the rear end of the strap 12, provides support at the opposite end. The machine is preferably used upon an elevated base, such as a store-counter, thereby placing the operating-shafts in a position convenient for their manipulation.

In the cases of heavy goods, such as carpets, that it is not desirable to lift any great distance on account of their weight the machine may be rested upon the floor, and to provide for its handy actuation in such instances I place the operating-shafts at the upper end of the machine. In this connection, referring to Fig. VIII, $15^a$ designates a cross-beam that is slidably mounted on the guide-rod $9^a$ and is adapted to take the place of the arms 15 and collar 13. The cloth-roll-holding spool at the delivery end of the machine is suitably journaled in one end of the beam $15^a$. The opposite end of the beam contains the operating-shaft $27^a$, provided with a pinion $26^a$, that meshes with a pinion $25^a$. The pinion $25^a$ is mounted on a socket-spindle $25^b$, adapted to receive the upper end of the spool A, which is held thereto by the set-screw $25^c$. The shaft $27^a$ is thus placed at a convenient height for the handy use of the crank-handle $27^b$ applied to the shaft.

It is desirable to retard the movement of the turn-table at the delivery end of the machine, so that the roll of cloth will not unwind too rapidly as the cloth is being measured therefrom, and also to put tension upon the winding-roll. I therefore apply brake-wheels 42 and 43 upon the shafts 27, the wheel 43 having flat surfaces 44, the purpose of which will be hereinafter explained. The brake-wheels 42 and 43 are adapted to receive the frictional contact of brake-shoes 45, carried by stems 46, mounted in socket-arms 47, that are secured to the frame 3 of the machine. The shoe-carrying stems 46 are projected forwardly to carry the shoes into frictional contact with the brake-wheels by screw-rods 48, provided with handles 49. The desired braking of the shaft 27 at the delivery end of the machine is thereby accomplished, so that the turn-tables may not revolve rapidly and cause too rapid an unwinding of the roll of cloth mounted thereon, and also so that a tension is effected upon the cloth passing from the delivery-roll to the receiving-roll, this being effected by reason of the retarded movement of the delivery turn-table causing the cloth to be always under strain and stretched taut in its transference to the receiving-roll, with the result that it is wound tightly about said receiving-roll.

In the use of flat spools or boards from which the roll of cloth is unwound the greater diameter of the flat-sided roll results in more leverage at two positions of the revolution thereof—i. e., when the flat sides of the roll are at angles to the guide-bar 8—than there is when the roll is passing through a part of its revolution in which its flat sides are approximately in line with the guide-bar. There is, therefore, a dead-center produced in the rotation of the turn-table when the leverage is least, and to overcome this dead-center each time that it occurs I provide one of the brake-wheels—namely 43, as seen in Fig. V—with the flat surfaces 44, against which the brake-shoe 45 does not contact each time that the dead-center is reached, and when a roll of greater width than thickness is being used in the machine at the delivery end thereof I place the delivery-roll upon the end of the machine provided with such wheel 43.

It will be observed that the machine herein shown and described is very simple in construction and that the parts are all so constructed and arranged that they operate with the greatest ease, this ease of operation being noticeably true with regard to the turn-tables, each having only a single supporting-spindle 24 journaled at its lower end in the frame 3.

I claim as my invention—

1. In a cloth-measuring machine, the combination of a receiving turn-table, a delivery turn-table, means for measuring the cloth, a shaft geared to said delivery turn-table, a brake-wheel having flat surfaces and mounted on said shaft, and a brake-shoe adapted to bear in frictional contact with said brake-wheel, substantially as described.

2. In a cloth-measuring machine, the combination of a delivery turn-table and a receiving turn-table, clamping-jaws carried by said turn-tables adapted to receive spools or boards, a guide-rod, slidable arms arranged on said guide-rod, slide-rods mounted in said arms, crotches carried by said slide-rods adapted to engage said boards or spools, a guide-bar, and a measuring-roller arranged to bear against the cloth at said guide-bar, substantially as described.

CHAS. H. YOUNG.

In presence of—
  E. S. KNIGHT,
  N. V. ALEXANDER.